3,162,062
BICYCLE CHAIN GUARD
William F. Jacoby, Little Rock, Ark., assignor to American Machine & Foundry Company, a corporation of New Jersey
Filed June 13, 1963, Ser. No. 287,597
8 Claims. (Cl. 74—611)

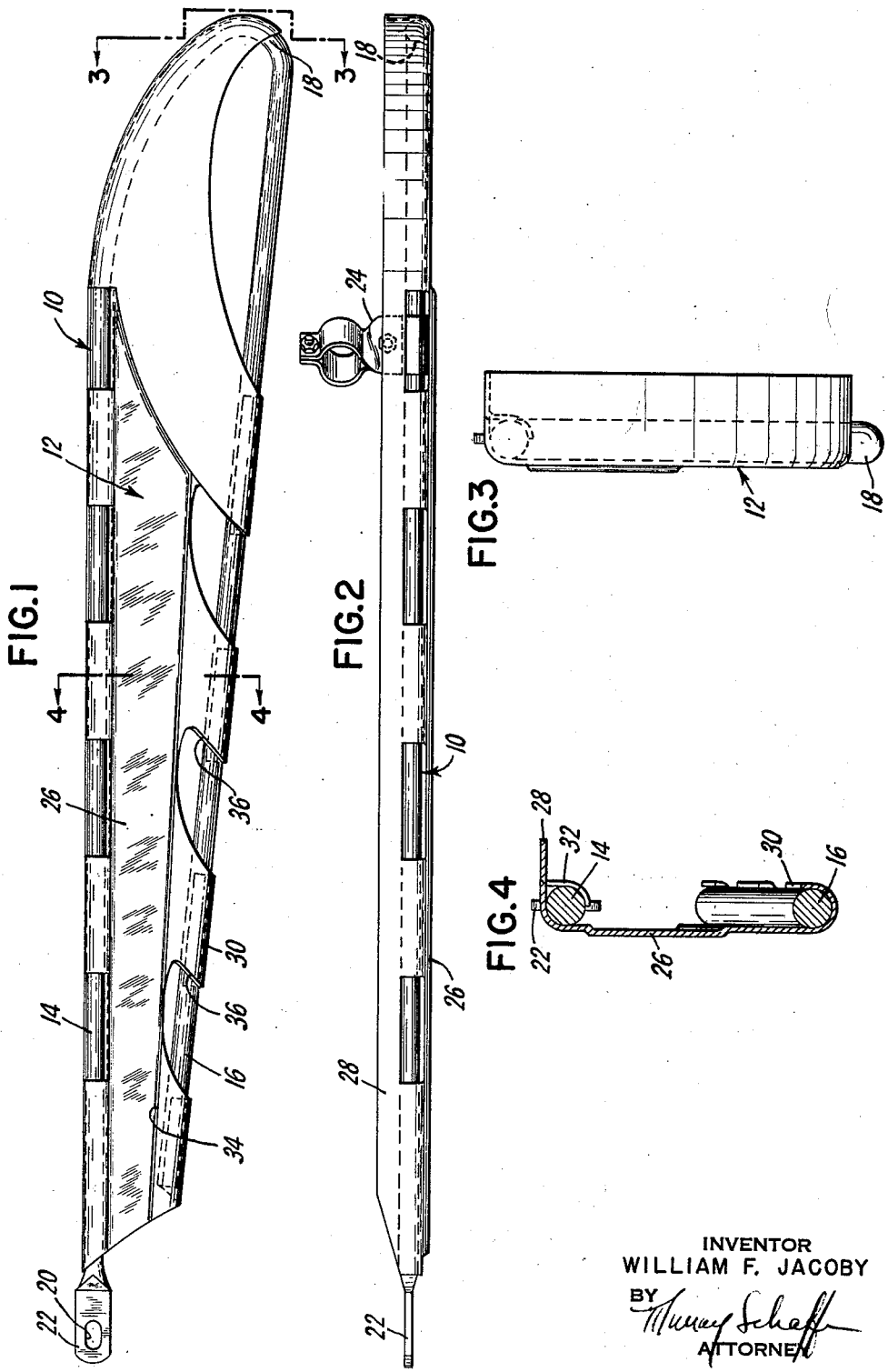

The present invention relates to bicycle chain guards or covers.

Bicycle guards are at present formed of a one-piece metal stamping shaped to fit over the drive chain and sprocket wheels and are provided with brackets for attachment to the frame and flanged edges to cover the moving chain. The disadvantage of this widely used form of chain guard lies in its one-piece construction, for it is relatively expensive to fabricate, difficult to install or remove in order to make repairs to the drive mechanisms, and limited to only one form of bicycle since each bicycle frame would require its own particularly sized and designed one-piece guard.

It is the object of the present invention to provide a simple and easily manufactured chain guard or cover, comprising the combination of a resilient wire backbone which is attached to the bicycle frame and a separable cover plate to be mounted on this backbone.

It is the further object to provide the wire backbone as a variable fastening device, readily adaptable for mounting on any size bicycle frame and on which an alternate number of covers, more specifically designed for the particular frame, can be mounted. Since the guard of the present invention is in two-piece form, it eliminates the disadvantage enumerated above.

Other advantages and objects will be apparent from the following description and the appended drawings in which:

FIG. 1 is a side elevation of the preferred embodiment of the invention;

FIG. 2 is a plan view of the parts seen in FIG. 1;

FIG. 3 is a front end view taken from the right side of FIG. 1;

FIG. 4 is a vertical cross section view taken substantially along line 4—4, FIG. 1.

As will be seen in FIG. 1, the novel chain guard comprises a backbone 10 and a removable cover plate 12. The backbone is constructed of an elongated circular wire bent in a single plane into a modified U-shaped form having an upper leg 14, a lower leg 16 and a curved front end portion 18. The rear end of the upper leg 14 is flattened and provided with a hole 20 to define a fitting 22 which is adapted to be secured to the rear axle of a bicycle (not shown) in a manner conventional to the art. A bracket 24 is located on the forward portion of the upper leg and is used to clamp the wire backbone to the depending cross bar of a bicycle frame (not shown) also in a conventional manner. It will be noted that because the backbone 10 is a smooth independent member, the bracket 24 is adjustable thereon so that its position on the upper leg may be varied to conform to the frame of the bicycle. Thus, the same backbone may be adapted for any number of different frames.

It will be observed that the lower leg 16 is not fastened to the bicycle frame. Because of this, it acts as a resilient spring member with respect to the upper leg. The purpose of such spring action will be discussed in detail later with respect to the mounting of the cover plate 12.

It will be appreciated that the shape of the backbone as shown in the drawings, resembling a chordal section of a conventional air foil, is by way of illustration only. The essential feature of the structure is the provision of a pair of generally coextending elongated legs connected by a curved portion at one end whereby the legs are sprung with respect to each other. Other shapes and designs will readily suggest themselves to those skilled in the art.

The cover plate 12 comprises a substantially flat panel 26, an upper flange portion 28 adapted to overlie the upper leg 14 of the backbone and to extend over the drive chain and sprocket (not shown) and a lower curved flange portion 30 into which the lower leg 16 of the backbone 10 is adapted to be received. The underside of the upper flange 28 is provided with at least one depending clip member 32 which, co-operating with the adjacent portion of panel 26, provides secure retaining means for the cover plate on the upper leg 14 of the backbone. Thus, the cover plate may be detachably secured on the backbone by first snapping the upper leg 14 into a clip-cover retaining means 32 and springing the lower leg 16 into the lower curved flange portion 30. To this end, the resiliency of the lower leg 16 with respect to the upper leg 14 is important since it facilitates the mounting and demounting of the cover plate and insures a firm and secure grip.

The cover plate may of course be made of metal, plastic or other suitable material and need not be of the same composition as the backbone. While it should preferably be of the same shape as the backbone, this is not essential since the clip 32 and the lower flange 30 need grip only a portion of the upper and lower legs. That is, the cover can be longer or shorter than the backbone, as desired. Further, the cover can be made wider and deeper than the backbone by extending either or both the panel 26 and the upper flange 28.

As shown, the cover plate is embossed as at 34 and is provided with cut-out portions 36. While such cut-out portions ease the job of mounting the plate, they and the embossing are purely for decorative purposes. Numerous decorative designs will be obvious to those skilled in the art.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A bicycle chain guard comprising a generally U-shaped resilient member, a cover plate for said member, opposed lateral flanges on said plate, the cover plate being detachably mounted over said member by a spring fit of said member between said flanges, and means on said member for coupling the latter to the frame of a bicycle so that the cover plate lies in a substantially vertical plane with one flange extending over the sprocket drive and the upper run of a sprocket chain.

2. The combination according to claim 2, in which the means for coupling the member to a bicycle frame is adjustably mounted on said member to accommodate different bicycle frame constructions.

3. A bicycle chain guard comprising a resilient rod smoothly bent at an intermediate portion to define a pair of substantially coextensive legs, a cover plate substantially coextensive with the legs, integral lateral marginal flanges on said cover plate, the cover plate being detachably secured over the member by a spring fit of said legs of said member between said flanges, and adjustable means on said member for coupling the latter to a bicycle frame so that one marginal flange overlies the sprocket drive and upper run of the chain of a bicycle.

4. A bicycle chain guard comprising a substantially U-shaped rod of resilient material, an elongated cover plate for said member, at least one integral flange extending from each lateral edge of said cover plate, the cover plate being detachably secured to said member by a spring fit of the legs of said member between said flanges, and adjustable means on said member for coupling said guard to a bicycle frame.

5. The combination according to claim 4, in which the coupling means include a bracket slidably mounted on one leg of said member and adapted to be clamped to the depending cross-bar of a bicycle frame, and an apertured lug at the end of said one leg adapted to be coupled to the rear axle of a bicycle.

6. The combination according to claim 4, in which the flanges are provided with curved portions to accommodate the legs of the U-shaped member.

7. The combination according to claim 6, in which the curved portion of one flange defines a clip into which one leg of the U-shaped member is adapted to be snapped, and the curved portion of the other flange defines an arcuate groove into which the other leg of the U-shaped member is adapted to be sprung.

8. A bicycle chain guard assembly comprising a substantially flat cover plate, a pair of opposed marginal flanges integral with said cover plate, a generally U-shaped resilient member releasably sprung between said flanges with the legs of the resilient member engaging said flanges, and adjustable means on one of the legs for releasably coupling the guard assembly to the frame of a bicycle.

No references cited.